United States Patent [19]

Yatsunami

[11] Patent Number: 5,307,404
[45] Date of Patent: Apr. 26, 1994

[54] SIGNAL DETECTING DEVICE
[75] Inventor: Kenroh Yatsunami, Nara, Japan
[73] Assignee: Sharp Kabushiki Kaisha, Osaka, Japan
[21] Appl. No.: 723,254
[22] Filed: Jun. 28, 1991
[30] Foreign Application Priority Data
Jun. 28, 1990 [JP] Japan .................................. 2-172053
[51] Int. Cl.⁵ ............................................. H04M 1/00
[52] U.S. Cl. ..................................... 379/386; 379/372
[58] Field of Search ............... 379/372, 373, 377, 381, 379/382, 386; 307/360, 525

[56] References Cited
U.S. PATENT DOCUMENTS

| | | | |
|---|---|---|---|
| 3,537,001 | 12/1968 | Friend | 324/78 |
| 4,386,239 | 5/1983 | Chien | 379/386 |
| 4,539,692 | 9/1985 | Munter | 379/386 |
| 4,639,681 | 1/1987 | Hasegawa | 307/360 X |
| 4,675,898 | 6/1987 | Bellenger . | |
| 4,696,031 | 9/1987 | Freudberg et al. | 379/386 |
| 4,747,131 | 5/1988 | Beirne . | |
| 4,796,030 | 1/1989 | Colotti et al. | 307/360 X |
| 4,809,321 | 2/1989 | Morgansten et al. | 379/386 |
| 4,979,214 | 12/1990 | Hamilton | 379/386 X |
| 5,007,000 | 4/1991 | Baldi | 379/386 X |
| 5,063,593 | 11/1991 | Kwon | 379/377 X |

FOREIGN PATENT DOCUMENTS 2157918 10/1985 United Kingdom .

OTHER PUBLICATIONS

Patent Abstracts of Japan, vol. 014, No. 095, JP-A-13 0064.
Patent Abstracts of Japan, vol. 012, No. 441, JP-A-63 169 571.
Patent Abstracts of Japan, vol. 102, No. 115, JP-A-62 242 447.

Primary Examiner—James L. Dwyer
Assistant Examiner—M. Shehata

[57] ABSTRACT

A signal detecting device capable of determining whether automatically dialling transmission is to be carried out by detecting an identification signal sent from an exchange system via a telephone line. The frequency variation of the identification signal is constant since the identification signal is a composite wave of a plurality of constant frequency signals. A pulse train having substantially a constant number of pulses can be obtained by comparing the level of the identification signal provided from the telephone line with a predetermined reference voltage by voltage comparators. Frequency counters count for a constant time period the number of pulses included in the pulse train provided from voltage comparators. According to the count result output of frequency counters, a determining circuit makes determination whether an identification signal is received or not.

5 Claims, 4 Drawing Sheets (a)

(b)

(c)

SIGNAL DETECTING DEVICE

BACKGROUND OF THE INVENTION

1. Field of the Invention

The present invention relates to signal detecting devices, and more particularly, to a device employed in a communication apparatus comprising an automatically dialling transmitting function the signal detecting device detecting a identification signal which is a composite wave of a plurality of frequencies transmitted from an exchange system via a telephone line.

2. Description of the Background Art

Many communication apparatus connected to a public telephone line such as a facsimile apparatus are provided with automatically dialling transmitting functions. Regarding the procedure of connection with a called device by the automatically dialling transmitting function, a communication apparatus receives an identification signal transmitted from an exchange of a public telephone line or a private branch exchange (a PBX, referred to as "exchange system" hereinafter), to send a dial signal after making determination that the exchange system is at a state that can receive a dial signal.

The above-mentioned identification signal comprises the so-called dial tone and busy tone. A composite signal which is the composition of two different constant frequency signals is generally used as an identification signal.

A conventional signal detecting device for detecting this composite signal is shown in FIG. 7.

The signal detecting device of FIG. 7 is implemented to detect a composite signal that is a composition of a signal of frequency $f_1$ and a signal of frequency $f_2$. The signal detecting device comprises a CML (Connect Model to Line) relay 1, a matching transformer 2, a modem 3, an amplifier 4, tone detectors 5 and 6, and an AND gate 7. CML relay 1 is a switching circuit for selectively connecting the telephone line to either of matching transformer 2 or amplifier 4. Matching transformer 2 is inserted between CML relay 1 and modem 3 for matching the characteristic impedance of the telephone line, and for insulating modem 3 from the telephone line. Amplifier 4 amplifies the signal transmitted from the exchange system in the automatically dialling transmission. Tone detector 5 detects the signal component of frequency $f_1$ from the output of amplifier 4. Tone detector 6 detects the signal component of frequency $f_2$ from the output of amplifier 4. AND gate 7 performs an operation of the logical product of the outputs of tone detectors 5 and 6.

As shown in FIG. 8, tone detectors 5 and 6 provide a logic 0 signal when a frequency component within a range ($f_0 \pm \Delta f$) centered about the frequency ($f_0$) to be detected is applied, and a logic 1 signal when a frequency component outside the above mentioned range is applied.

When the outputs of tone detectors 5 and 6 are both logical 0, a composite signal comprising the frequency components of $f_1$ and $f_2$ from a telephone line is received by the device. At this time, AND gate 7 provides a logic 0 signal.

The output of AND gate 7 is applied as a control signal of an automatically dialling transmitting device (not shown). The automatically dialling transmitting device receives the logic 0 signal from AND gate 7 to make determination that the exchange system is at a state that can receive a dial signal. Then, a dial signal is transmitted.

The above described conventional signal detecting device had a disadvantage that the circuit structure is complicated since two tone detectors having complex structures are used. If the exchange system transmits a signal of another frequency of $f_3$ as another identification signal in addition to the above described composite signal, another tone detector must be provided for detecting frequency $f_3$ to result in a further complicated circuit. The structure of the tone detector is disclosed in, for example, laid-open Japanese Patent applications No.48-93203, No. 48-93204, and No.48-93205.

SUMMARY OF THE INVENTION

An object of the present invention is to provide a signal detecting device that can detect a identification signal with a simple circuit.

The signal detecting device of the present invention is a device employed in a communication apparatus comprising automatically dialling transmitting functions, the signal detecting device identification signal that is a composite wave of a plurality of frequency signals sent from an exchange system via a telephone line. The signal detecting device includes comparing means, counting means, and determining means. The comparing means compares the level of the signal transmitted through a telephone line with a predetermined threshold value. The counting means counts the number of pulses in the output signal of the comparing means for a predetermined constant time period. The determining means makes determination that the signal transmitted through the telephone line is an identification signal when the count value of the counting means is within a predetermined given range.

In accordance with the present invention, a identification signal can be detected with comparing means, counting means, and determining means that can be implemented with a simple structure, without using a tone detector having a complicated circuit structure, to obtain a simple and economical signal detecting device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be explained hereinafter with reference to the drawings.

Figure 1:
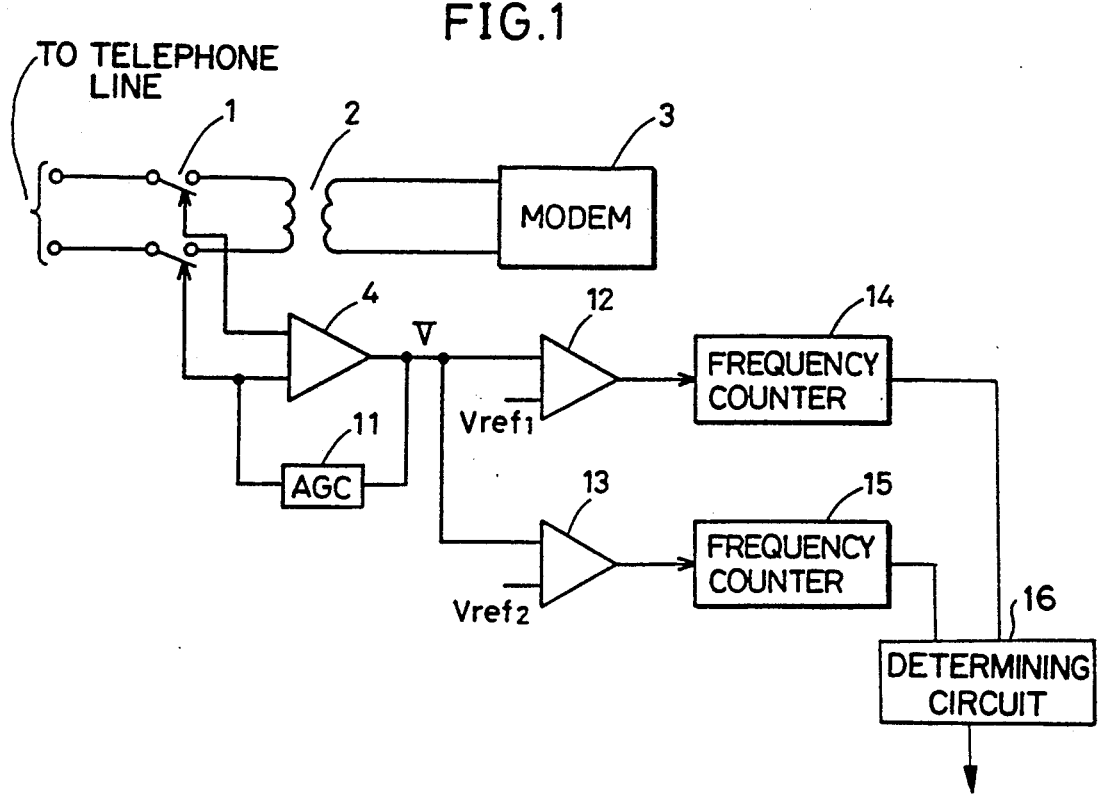
FIG. 1 is a block diagram of a structure of an embodiment of the present invention.

FIG. 1 is a block diagram of a structure of the first embodiment of the present invention. Referring to FIG. 1, the structures of CML relay 1, matching transformer 2, modem 3, amplifier 4 are similar to those of the conventional signal detecting device of FIG. 7, and their descriptions will not be repeated.

An automatic gain control circuit (AGC) is provided between the input end and output end of amplifier 4 in the embodiment of FIG. 1. Furthermore, voltage comparators 12 and 13, frequency counters 14 and 15, and a determining circuit 16 are provided in the embodiment of FIG. 1 instead of the tone detectors 5 and 6 and AND gate 7 in the conventional signal detecting device of FIG. 7. The output signal of amplifier 4 is applied to each one input end of voltage comparators 12 and 13. A first reference voltage $Vref_1$ is applied to the other input end of voltage comparator 12 as the threshold value for comparison (level discrimination). A second reference voltage $Vref_2$ is applied to the other input end of voltage comparator 13 as a threshold value for comparison (level discrimination). Frequency counter 14 counts the number of pulses included in the output signal of voltage comparator 12 for a constant time period. Frequency counter 15 counts the number of pulses included in the output signal of voltage comparator 13 for a constant time period. Determining circuit 16 makes determination whether an identification signal is transmitted or not from a telephone line according to the output signals of frequency counters 14 and 15.

The operation and function of the embodiment of FIG. 1 will be explained hereinafter.

The signal sent from an exchange system via a telephone line varies in signal level according to the distance from the exchange system and the state of the telephone line. It is desirable that the magnitude of the above mentioned signal has no fluctuation in the comparison (level discrimination) of the above mentioned signal with a reference voltage in voltage comparators 12 and 13. AGC 11 makes constant the magnitude of the output signal of amplifier 4 by controlling the amplification factor of amplifier 4 according to the DC voltage of the input signal for example.

Figure 2:
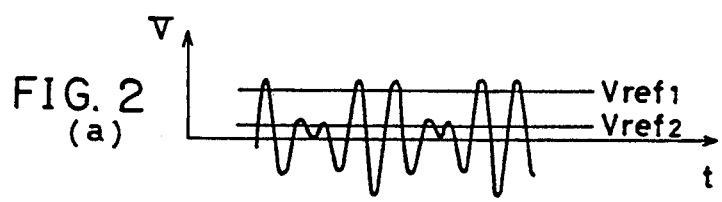
FIGS. 2a-c are a waveform chart indicating the input/output signal of a voltage comparator in the embodiment of FIG. 1.
Figure 2:
Figure 2:

FIG. 2 (a) shows a waveform of a identification signal that is a composite wave of frequencies of $f_1$ and $f_2$ transmitted from the exchange system, amplified by amplifier 4. The waveform of FIG. 2 (a) indicates the case of where $f_1 = 440$ Hz, $f_2 = 330$ Hz, as an example. Voltage comparators 12 and 13 compare the output voltage V of amplifier 4 with the respective reference voltages $Vref_1$ and $Vref_2$ to provide a logic 1 signal when the output voltage V is larger than reference voltages $Vref_1$ and $Vref_2$. The output signals of voltage comparators 12 and 13 are shown in FIGS. 2 (b) and (c), respectively. Frequency counters 14 and 15 receive the output signals of voltage comparators 12 and 13, shown in FIGS. 2 (b) and (c), respectively, to count the number of pulses thereof for a constant time period. The counted result output from frequency counters 14 and 15 are applied to determining circuit 16. Determining circuit 16 makes determination whether the input signal from the telephone line is a predetermined identification signal or not according to the outputs of frequency counters 14 and 15.

That is to say, since each of $f_1$ and $f_2$ that is the frequency components of the identification signal has constant frequency and a constant amplitude, the waveform of the identification signal of FIG. 2 (a) attains a constant waveform. If appropriate constant voltages are applied as reference voltages $Vref_1$ and $Vref_2$ of voltage comparators 12 and 13, the number of pulses counted by frequency counters 14 and 15 will be a constant and specific number. Assuming that the number value counted by frequency counters 14 and 15 are $Pc_1$ and $Pc_2$, respectively, and the above mentioned specific number value $Sc_1$ and $Sc_2$, respectively, $Pc_1 = Sc_1$ and $Pc_2 = Sc_2$ when the input signal from the telephone line is a predetermined identification signal. By carrying out the determination of this condition with determining circuit 16, an identification signal can be detected. However, this is the ideal case. In practice, there may be some error in $f_1$ and $f_2$ of the identification signal transmitted from the exchange system. $Pc_1$ and $Pc_2$ fluctuate within a certain range due to noise of the telephone line or noise within the signal detecting device of FIG. 1. Taking into consideration the above mentioned fluctuating range $\pm \alpha$, determining circuit 16 is implemented to make determination that a predetermined identification signal is received when $$(Sc_1 - \alpha) < PC_1 < (Sc_1 + \alpha)$$

and $$(Sc_2 - \alpha) < Pc_2 < (Sc_2 + \alpha)$$

This allows practical detection.

Figure 7:
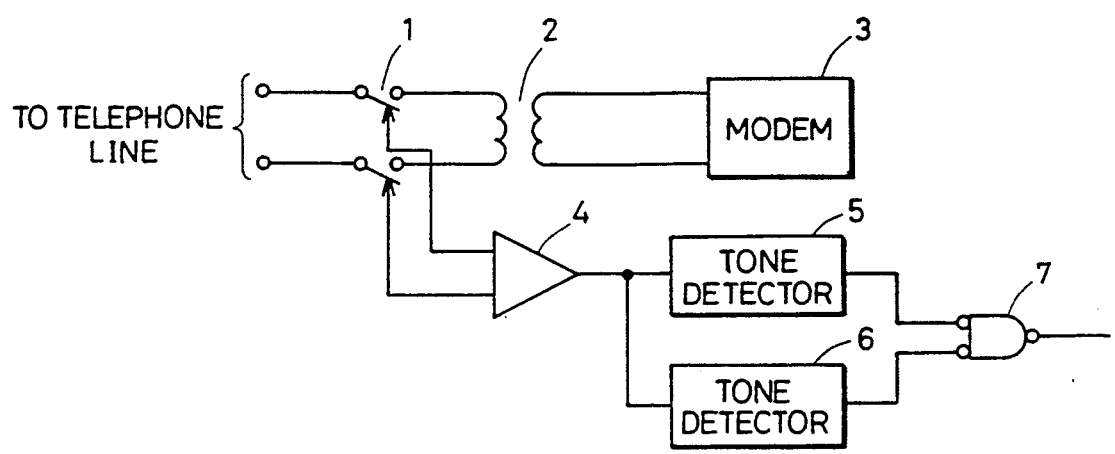
FIG. 7 is a block diagram showing a structure of a conventional signal detecting device.
Figure 8:
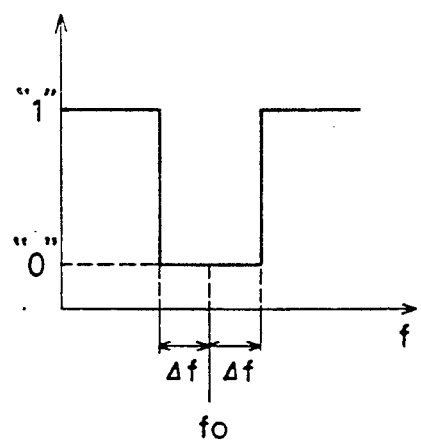
FIG. 8 is a characteristic diagram indicating the input/output characteristic of a tone detector in the conventional signal detecting device of FIG. 7.

Because the voltage comparator, the frequency counter, and the determining circuit have a simple structure circuit in the embodiment of FIG. 1 instead of a tone detector of a complicated structure, the entire structure of the device is simplified in comparison with a conventional signal detecting circuit shown in FIG. 7.

Figure 3:
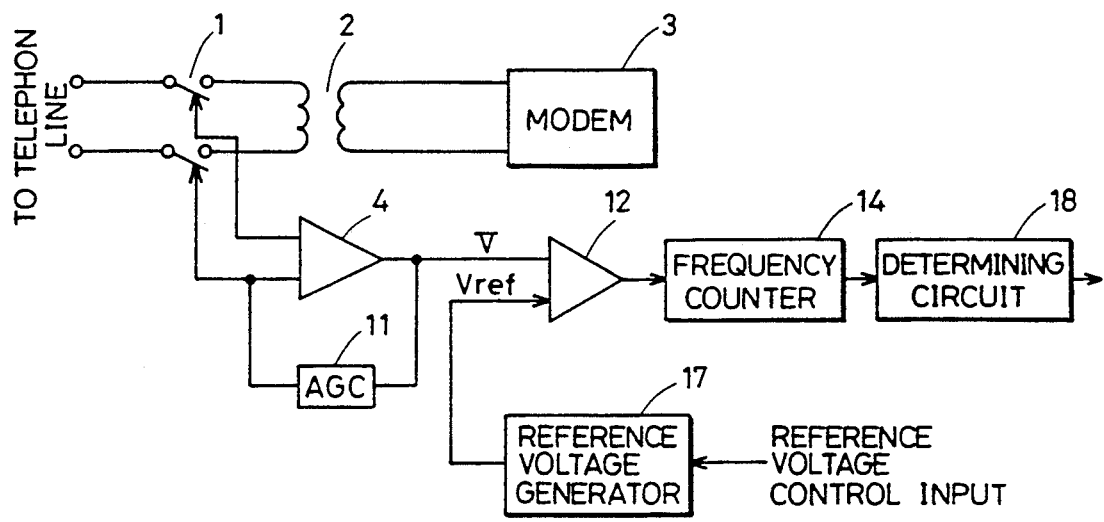
FIG. 3 is a block diagram showing a structure of a second embodiment of the present invention.

FIG. 3 is a block diagram of a structure of a second embodiment of the present invention. Referring to FIG. 3, voltage comparators 13 and frequency counter 15 in the embodiment of FIG. 1 are removed, and one voltage comparator 12 and one frequency counter 14 are provided. Voltage comparator 12 is applied with reference voltage Vref from a reference voltage generator 17. The output of frequency counter 14 is provided to a determining circuit 18. The remaining structures of the embodiment of FIG. 3 is similar to those of FIG. 1. Therefore, equivalent components have identical reference numbers denoted, and their descriptions will not be repeated.

The signal detecting apparatus of FIG. 1 carries out in parallel the comparison of two reference voltages $Vref_1$ and $Vref_2$ and the counting of the pulse numbers thereof. The signal detecting device of the embodiment of FIG. 3 carries out the comparison of two reference voltages $Vref_1$ and $Vref_2$ and the counting of the pulse numbers thereof in time series. More specifically, reference voltage generator 17 generates reference voltage $Vref_1$ when applied with a reference voltage control input of logic 1. Reference voltage $Vref_1$ is applied to voltage comparator 12, whereby voltage comparator 12 provides a pulse train shown in FIG. 2 (b). The number of pulses included in the output of voltage comparator 12 is counted for a constant time period by frequency counter 14. The result output Pc1 counted by frequency counter 14 is applied to determining circuit 18. When a reference voltage control input of logic 0 is applied to reference voltage generator 17, reference voltage generator 17 generates reference voltage $Vref_2$ which is applied to voltage comparator 12. Voltage comparator 12 provides a pulse train shown in FIG. 2 (c). The number of pulses included in the output of voltage comparator 12 is counted for a constant time period by frequency counter 14. This result output $Pc_2$ counted by frequency counter 14 is applied to determining circuit 18.

Similar to determining circuit 16 of FIG. 1, determining circuit 18 makes determination that a predetermined identification signal is received when $$(Sc_1 - \alpha) < Pc_1 < (Sc_1 + \alpha)$$

and $$(Sc_2 - \alpha) < Pc_2 < (Sc_2 + \alpha)$$

The embodiment of FIG. 3 has the circuit structure further simplified than that of FIG. 1 since voltage comparator 13 and frequency counter 15 shown in FIG. 1 are removed.

Figure 4:
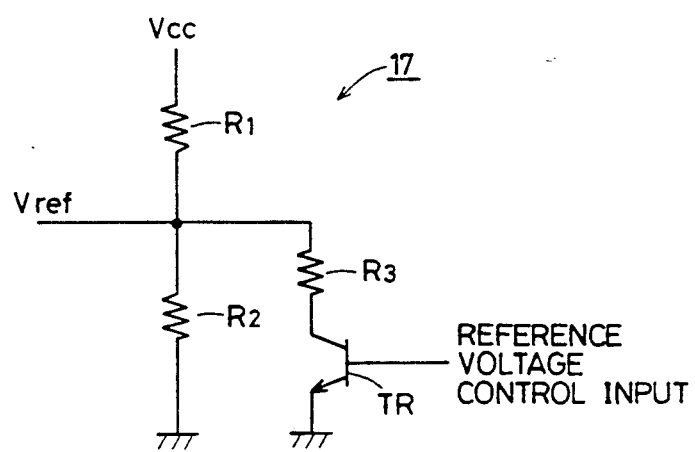
FIG. 4 is a circuit diagram specifically showing the structure of a reference voltage generator of the embodiment of FIG. 3.

FIG. 4 is a circuit diagram of an example of a structure of reference voltage generator 17 of FIG. 3. Referring to FIG. 4, reference voltage generator 17 comprises resistors $R_1$-$R_3$ and a transistor TR. Resistors $R_1$ and $R_2$ are connected in series between supply voltage Vcc and ground. Resistor $R_3$ is connected between the connection point of resistors $R_1$ and $R_2$ and the collector of transistor TR. Transistor TR has the emitter grounded and the base supplied with reference voltage control input. Reference voltage Vref is obtained from the connection point of resistors $R_1$ and $R_2$.

In reference voltage generator 17 of FIG. 4, when reference voltage control input is logic 1, transistor TR is turned on, and reference voltage Vref is:

$$Vref = Vcc \frac{R_2//R_3}{R_1 + R_2//R_3} = Vref_1$$

where $R_2//R_3$ is the parallel resistance value.

When reference voltage control input is logic 0, transistor TR is cut off, and reference voltage Vref is:

$$Vref = Vcc \frac{R_2}{R_1 + R_2} = Vref_2$$

If power supply voltage Vcc is a constant voltage, reference voltage generator 17 can generate constant reference voltages of $Vref_1$ and $Vref_2$.

The signal detecting device of FIG. 3 has a further simplified circuit structure since the number of voltage comparators and frequency counters can be reduced in comparison with the numbers of the embodiment of FIG. 1.

Figure 5:
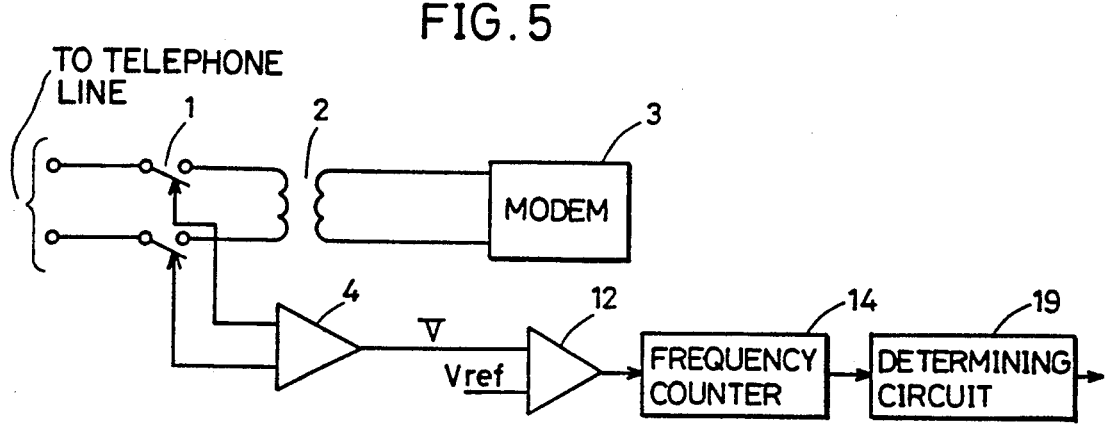
FIG. 5 is a block diagram showing a structure of a third embodiment of the present invention.
Figure 6A:
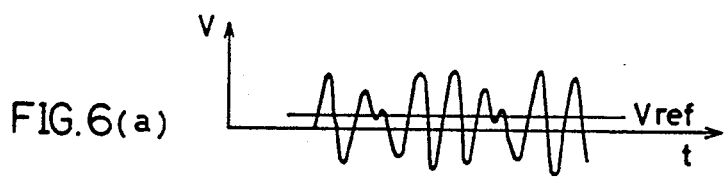
FIGS. 6a-d are a waveform chart indicating the input/output signal of a voltage comparator of the embodiment of FIG. 5.
Figure 6B:
Figure 6C:
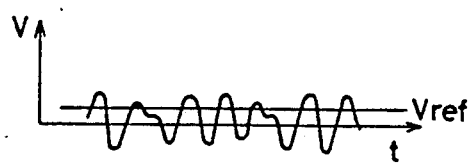
Figure 6D:

FIG. 5 is a block diagram of a structure of a third embodiment of the present invention. Referring to FIG. 5, AGC 11 is not provided in amplifier 4 in this embodiment. Therefore, amplifier 4 directly amplifies the input signal from the telephone line to provide a signal according to the input signal level to voltage comparator 12. Voltage comparator 12 compares the level of the output voltage V of amplifier 4 with a constant reference voltage Vref. Frequency counter 14 counts the number of pulses of the pulse train provided from voltage comparator 12 for a predetermined time period. A determining circuit 19 makes determination whether a predetermined identification signal is received or not by carrying out the following determination according to the count result output of frequency counter 14. The remaining structure of FIG. 5 is similar to those of the embodiments of FIGS. 1 and 3.

Because reference voltage Vref applied to voltage comparator 12 is always constant, the number of pulses included in the pulse train provided from voltage comparator 12 varies according to the magnitude of the identification signal provided from the telephone line, as shown in FIG. 6. When the magnitude of the identification signal is large as shown in FIG. 6 (a), the number of pulses is increased. When the magnitude of the identification signal is small as shown in FIG. 6 (c), the number of pulses is reduced. However, the frequency change is always constant even if there is fluctuation in the magnitude of the identification signal since the identification signal is a composite wave of constant frequency signals. By setting in advance the maximum value and the minimum value of the pulse number of a constant time period obtained on comparing the level with a constant reference voltage Vref, the entry of an identification signal can be detected within a practical range, even if the magnitude of the identification signal changes. Assuming that the maximum value is Scmax and the minimum value is Scmin, determining circuit 19 makes determination that a predetermined identification signal is received if the pulse number Pc counted by frequency counter 14 is $Scmin \leq Pc \leq Scmax$.

The embodiment of FIG. 5 has a further simplified circuit structure than that of the embodiment of FIG. 3 because reference voltage generator 17 generating two types of reference voltages is not required.

Although the above described embodiments are implemented to detect an identification signal which is a composition of two different frequencies, the invention is not limited to the described embodiments, and an identification signal which is a composition of three or more types of frequencies can be detected. In this case, the number of voltage comparators and frequency counters should be increased according to the number of frequency signals used for the composition of the identification signal in the embodiment of FIG. 1. In the embodiment of FIG. 3, the number of types of reference voltages generated by reference voltage generator 17 should be increased according to the number of the above mentioned frequency signals. Because the embodiment of FIG. 5 always uses a constant voltage reference, detection of reception of an identification signal can be carried out directly with the structure of FIG. 5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal detecting device employed in a communication apparatus comprising an automatically dialling transmitting function, the signal detection device detecting a tone signal which is a composite wave of n types of frequencies (n being a positive integer) sent from an exchange system via a telephone line, said signal detecting device comprising:

comparator means for comparing the level of the tone signal transmitted through said telephone line with a plurality of predetermined threshold values to generate comparator output signals, said threshold values comprises n values each of a different level, the comparator means comprises n comparators for comparing the signal transmitted values individually through said telephone line with n threshold values individually, counter means comprising n counters for counting for a predetermined constant time period the number of pulses included in the comparator output signals of said comparator means and generating count values, and determining means for making determination that the signal transmitted through said telephone line is said tone signal when the count values of said counting means are within a predetermined given range.

2. The signal detecting apparatus according to claim 1, wherein said comparator means comprises one comparator sequentially applied with the n threshold values for comparing in time series the n threshold values with the signal transmitted through said telephone line.

3. The signal detecting apparatus according to claim 1, wherein said comparator means includes one comparator for comparing the signal transmitted through said telephone line with said single threshold value.

4. The signal detecting device according to claim 1, further comprising amplifying means for amplifying the signal transmitted through said telephone line before being applied to said comparator means.

5. The signal detecting device according to claim 4, further comprising gain control means for keeping constant the magnitude of the output of said amplifying means by controlling the gain of said amplifying means according to the magnitude of the signal transmitted through said telephone line.

* * * * *